(12) United States Patent
Hardage, Jr.

(10) Patent No.: US 7,146,468 B2
(45) Date of Patent: Dec. 5, 2006

(54) CACHE MEMORY AND METHOD FOR HANDLING EFFECTS OF EXTERNAL SNOOPS COLLIDING WITH IN-FLIGHT OPERATIONS INTERNALLY TO THE CACHE

(75) Inventor: James N. Hardage, Jr., Austin, TX (US)

(73) Assignee: IP-First, LLC., Fremont, CA (US)

( * ) Notice: Subject to any disclaimer, the term of this patent is extended or adjusted under 35 U.S.C. 154(b) by 407 days.

(21) Appl. No.: 10/266,018

(22) Filed: Oct. 7, 2002

(65) Prior Publication Data

Related U.S. Application Data

(60) Provisional application No. 60/375,469, filed on Apr. 24, 2002.

(51) Int. Cl.
G06F 12/00 (2006.01)
G06F 12/08 (2006.01)
G06F 13/00 (2006.01)

(52) U.S. Cl. .................... 711/141; 711/3; 711/118; 711/119; 711/122; 711/140; 711/146

(58) Field of Classification Search ............ 711/3, 711/113, 118, 119, 122, 140, 141, 146; 709/247
See application file for complete search history.

(56) References Cited

U.S. PATENT DOCUMENTS

| | | | | |
|---|---|---|---|---|
| 5,598,550 A | * | 1/1997 | Shen et al. ............... | 711/146 |
| 5,784,571 A | * | 7/1998 | Mantopoulos et al. ...... | 709/247 |
| 5,784,590 A | * | 7/1998 | Cohen et al. ............... | 711/122 |
| 5,850,534 A | * | 12/1998 | Kranich ...................... | 711/144 |
| 6,076,147 A | * | 6/2000 | Lynch et al. ................ | 711/146 |
| 6,119,222 A | * | 9/2000 | Shiell et al. ................ | 712/238 |
| 6,272,601 B1 | * | 8/2001 | Nunez et al. ............... | 711/140 |
| 6,473,837 B1 | * | 10/2002 | Hughes et al. ............. | 711/146 |
| 2004/0139281 A1 | * | 7/2004 | McDonald .................. | 711/133 |

* cited by examiner

Primary Examiner—Mano Padmanabhan
Assistant Examiner—Mardochee Chery
(74) Attorney, Agent, or Firm—E. Alan Davis; James W. Huffman

(57) ABSTRACT

A cache memory that completes an in-flight operation with another cache that collides with a snoop operation, rather than canceling the in-flight operation. Operations to the cache comprise a query pass and one or more finish passes. When the cache detects a snoop query intervening between the query pass and a finish pass of the in-flight operation, the cache generates a more up-to-date status for the snoop query that takes into account the tag status to which the in-flight finish pass will update the implicated cache line. This is necessary because otherwise the snoop query might not see the affect of the in-flight finish pass status update. This allows the in-flight finish pass to complete instead of being cancelled and the snoop finish pass to correctly update the status after the in-flight finish pass, and to provide modified data from the cache line to the externally snooped transaction.

34 Claims, 6 Drawing Sheets

Microprocessor Cache Hierarchy

L2 Cache

FIG. 4

| valid | address | snoop update status | provide data |
|---|---|---|---|
| yes | 0x1234567 | I | no |
| yes | 0x0abcdef | S | no |
| yes | 0x3333333 | I | yes |
| no | 0x2233445 | I | yes |

204

Snoop Action Queue

L2 Cache Operation

FIG. 6 (Related Art)

|   | 1 | 2 | 3 | 4 | 5 | 6 | 7 | 8 | 9 |
|---|---|---|---|---|---|---|---|---|---|
| J | StQ A | SnpQ A |  |  |  | SnpA A |  |  |  |
| K |  | StQ A | SnpQ A |  |  |  | SnpA A |  |  |
| L |  |  | StQ A | SnpQ A |  |  |  | SnpA A |  |
| M |  |  |  | StQ A | SnpQ A |  |  |  | SnpA A |

FIG. 7

|   | 1 | 2 | 3 | 4 | 5 | 6 | 7 | 8 | 9 |
|---|---|---|---|---|---|---|---|---|---|
| J | StQ A | SnpQ A |  |  | StA A | SnpA A |  |  |  |
| K |  | StQ A | SnpQ A |  |  | StA A | SnpA A |  |  |
| L |  |  | StQ A | SnpQ A |  |  | StA A | SnpA A |  |
| M |  |  |  | StQ A | SnpQ A |  |  | StA A | SnpA A |

CACHE MEMORY AND METHOD FOR HANDLING EFFECTS OF EXTERNAL SNOOPS COLLIDING WITH IN-FLIGHT OPERATIONS INTERNALLY TO THE CACHE

This application claims priority based on U.S. Provisional Application, Ser. No. 60/375,469, filed Apr. 24, 2002, entitled METHOD FOR HANDLING AFFECTS OF EXTERNAL SNOOPS INTERNALLY TO L2 CACHE.

FIELD OF THE INVENTION

This invention relates in general to the field of cache memories in microprocessors, and particularly to multi-pass pipelined caches and the effects of external snoop operations thereon.

BACKGROUND OF THE INVENTION

Many modern computer systems are multi-processor systems. That is, they include multiple processors coupled together on a common bus that share the computing load of the system. In addition, the multiple processors typically share a common system memory. Still further, each of the processors includes a cache memory, or typically a hierarchy of cache memories.

A cache memory, or cache, is a memory internal to the processor that stores a subset of the data in the system memory and is typically much smaller than the system memory. Transfers of data with the processor's cache are much faster than the transfers of data between the processor and memory. When a processor reads data from the system memory, the processor also stores the data in its cache so the next time the processor needs to read the data it can more quickly read from the cache rather than having to read the data from the system memory. Similarly, the next time the processor needs to write data to a system memory address whose data is stored in the cache, the processor can simply write to the cache rather than having to write the data immediately to memory, which is commonly referred to as write-back caching. This ability to access data in the cache thereby avoiding the need to access memory greatly improves system performance by reducing the overall data access time.

Caches store data in cache lines. A common cache line size is 32 bytes. A cache line is the smallest unit of data that can be transferred between the cache and the system memory. That is, when a processor wants to read a cacheable piece of data from memory, it reads all the data in the cache line containing the data and stores the entire cache line in the cache. Similarly, when a new cache line needs to be written to the cache that causes a modified cache line to be replaced, the processor writes the entire replaced line to memory.

The presence of multiple processors each having its own cache that caches data from a shared memory introduces a problem of cache coherence. That is, the view of memory that one processor sees through its cache may be different from the view another processor sees through its cache. For example, assume a location in memory denoted X contains a value of 1. Processor A reads from memory at address X and caches the value of 1 into its cache. Next, processor B reads from memory at address X and caches the value of 1 into its cache. Then processor A writes a value of 0 into its cache and also updates memory at address X to a value of 0. Now if processor A reads address X it will receive a 0 from its cache; but if processor B reads address X it will receive a 1 from its cache.

The example above illustrates the need to keep track of the state of any cache lines that are shared by more than one cache in the system. One common scheme for enforcing cache coherence is commonly referred to as snooping. With snooping, each cache maintains a copy of the sharing status for every cache line it holds. Each cache monitors or snoops every transaction on the bus shared by the other processors to determine whether or not the cache has a copy of the cache line implicated by the bus transaction initiated by another processor. The cache performs different actions depending upon the type of transaction snooped and the status of the cache line implicated. A common cache coherency status protocol is the MESI protocol. MESI stands for Modified, Exclusive, Shared, Invalid, which are the four possible states or status values of a cache line in a cache.

One method of maintaining cache coherence commonly used with snooping is to ensure that a processor has exclusive access to a cache line before writing data to it. This method is commonly referred to as a write invalidate protocol because on a write it invalidates any copies of the implicated cache line in the other caches. Requiring exclusive access ensures that no other readable or writable copies of a cache line exist when the writing processor writes the data.

To invalidate the other copies of the cache line in the other caches, the invalidating processor gains access to the bus and provides on the bus the address of the cache line to be invalidated. The other caches are snooping the bus and check to see if they are -currently caching the address. If so, the other caches change the state of the cache line to Invalid.

In addition, each cache also snoops the bus to determine if it has a modified cache line that is being read by another processor. If so, the cache provides the modified cache line, either by writing the modified cache line to memory or providing the modified cache line to the requesting processor, or both. The transaction reading the cache line may allow the cache line to be shared or it may require the other caches to invalidate the line.

Processor caches typically include a hierarchy of caches. For example, a processor may have a level-one (L1) and level-two (L2) cache. The L1 cache is closer to the computation elements of the processor than the L2 cache, and is capable of providing data to the computation elements faster than the L2 cache. Furthermore, the caches may be further divided into separate instruction caches and data caches for caching instructions and data, respectively.

The various caches within the cache hierarchy of the processor transfer cache lines between one another. For example, if a cache address misses in an L1 cache, the L1 might load the missing cache line from an L2 cache in the processor if it is present in the L2. Also, if an L1 cache needs to replace a valid cache line with a newer cache line, the L1 cache may cast out the replaced cache line to the L2 cache rather than writing the cache line to system memory. This is particularly common for write-back cache configurations.

The transfer of a cache line between two caches in a processor may require several processor clock cycles. This may be true for several reasons. One reason is that caches typically comprise a pipeline of multiple stages, wherein each stage processes a portion of an operation during a clock cycle, implying that multiple clock cycles are required to read or write the cache. Additionally, caches are often multi-pass caches, meaning that a first pass, typically referred to as a query pass, through the pipeline is required to obtain the status of the implicated cache line. One or more subsequent passes are required to update the cache based on the status obtained or to read additional data that was not obtained during the query pass. Still further, the caches may be spatially located a relatively large distance away from one another on the processor integrated circuit, requiring additional clock cycles for long signal paths and/or signals which require propagation delays through many logic gates to generate.

For example, assume the processor stores a new cache line to its L1 cache forcing the L1 to replace a modified cache line. The L1 may castout the modified cache line that was chosen for replacement to an L2 cache on the processor. The L1 reads the castout line from its pipeline and stores the line into a buffer between the two caches. The L1 informs the L2 of the castout and subsequently overwrites the castout line with the new cache line. The L2 reads the castout line from the castout buffer and writes the line into itself.

This works well as long as the caches do not snoop a transaction on the bus that collides with the address of the castout line during the castout, i.e., that has the same address as the castout line. A colliding snoop while the castout is in-flight introduces significant design problems that must be addressed. For example, if the snooped transaction is a read and the cache line that is in-flight is a cache line with modified data that has not been written to memory, which of the two caches will supply the cache line data to the snooped transaction on the bus? Which of the two caches will own the castout line in order to update its status?

The conventional approach to the problem has been to cancel or kill the in-flight operation. However, this approach has negative side effects. It increases the timing and complexity of the cache control logic to be able to handle the cancelled in-flight operation. For example, in the example above, the L1 cache must delay overwriting the castout line with the new line until it is informed by the L2 that it is safe to do so. The longer the L1 must wait to overwrite the castout line, the more complicated the process to back out and/or retry the operation. Also, the added delay may adversely affect performance. Furthermore, the added communication between the caches in the form of cancellation and handshaking may take place on signals between the two caches that are relatively long and have significant propagation delay if the two cache blocks are a relatively great distance from one another, which may consequently create critical timing paths.

Therefore, what is needed is a cache that internally handles the effects of an external snoop that collides with an in-flight operation rather than killing it.

SUMMARY OF THE INVENTION

The present invention provides a cache memory that detects collisions between an externally snooped transaction and an in-flight operation and internally handles the collision rather than canceling the in-flight operation. Accordingly, in attainment of the aforementioned object, it is a feature of the present invention to provide a multi-pass cache memory in a microprocessor. The cache memory includes a single-ported tag array that stores cache coherency status for a plurality of cache lines and that receives a snoop query temporally between a query pass and a finish pass of an operation. The operation transfers a cache line between the cache memory and another cache memory in the microprocessor. The snoop query includes a snoop address. The cache also includes control logic, coupled to the tag array, which detects a collision between the snoop address and an address of the cache line. The control logic allows the finish pass to complete by updating the cache coherency status of the cache line in the single-ported tag array, rather than canceling the finish pass, in response to detection of the collision.

In another aspect, it is a feature of the present invention to provide a second level (L2) cache memory in a microprocessor for internally handling a snoop operation received in response to a transaction snooped on an external bus of the microprocessor and whose address collides with an in-flight operation transferring a cache line between the L2 cache and another cache in the microprocessor, rather than canceling the in-flight operation. The L2 cache includes a single-ported memory array, for storing a plurality of cache coherency statuses of a corresponding plurality of cache lines. The L2 cache also includes snoop collision logic that generates a snoop tag status based on an in-flight tag status of the in-flight operation and based on detection of an address collision between the snoop operation and the in-flight operation. The L2 cache also includes snoop action logic, coupled to the snoop collision logic, which generates a snoop action based on the snoop tag status. The snoop action updates a cache coherency status of the cache line within the single-ported memory array after the in-flight operation updates the cache coherency status to the in-flight tag status.

In another aspect, it is a feature of the present invention to provide a method for a first cache to internally handle a snoop operation implicating a cache line that is in-flight between a second cache and the first cache, rather than the first cache canceling the in-flight operation. The method includes querying a single-ported tag array of the first cache for a first status of the cache line by the in-flight operation during a first clock cycle, querying the single-ported tag array for a second status of the cache line by the snoop operation during a second clock cycle subsequent to the first clock cycle, and updating the single-ported tag array with a third status for the cache line by the in-flight operation, after querying for the second status during a third clock cycle subsequent to the second clock cycle. The method also includes generating a fourth status based on the second and third status and based upon detection of an address collision between the snoop operation and the in-flight operation. The method also includes updating the single-ported tag array with the fourth status for the cache line by the snoop operation, after updating with the third status during a fourth clock cycle subsequent to the third clock cycle, whereby cancellation of the in-flight operation is avoided.

An advantage of the present invention is that the cache advantageously keeps the results of the snoop collision completely contained within itself. This potentially improves processor cycle timing, particularly by eliminating the problems associated with inter-cache communications across the processor integrated circuit previously needed by the conventional approach to handle a cancellation of an in-flight operation whose address collided with an external snoop operation. Additionally, it reduces the complexity of other caches in the processor that initiate the in-flight operation.

Other features and advantages of the present invention will become apparent upon study of the remaining portions of the specification and drawings.

BRIEF DESCRIPTION OF THE DRAWINGS

FIG. 4 is a block diagram illustrating the snoop action queue of FIG. 2 according to the present invention.

FIG. 6 is a related art timing diagram illustrating an example of operation of a conventional L2 cache canceling an in-flight operation with which a snoop collides.

FIG. 7 is a timing diagram illustrating operation of L2 cache of FIG. 1 according to the flowchart of FIG. 5 according to the present invention.

DETAILED DESCRIPTION

Figure 1:
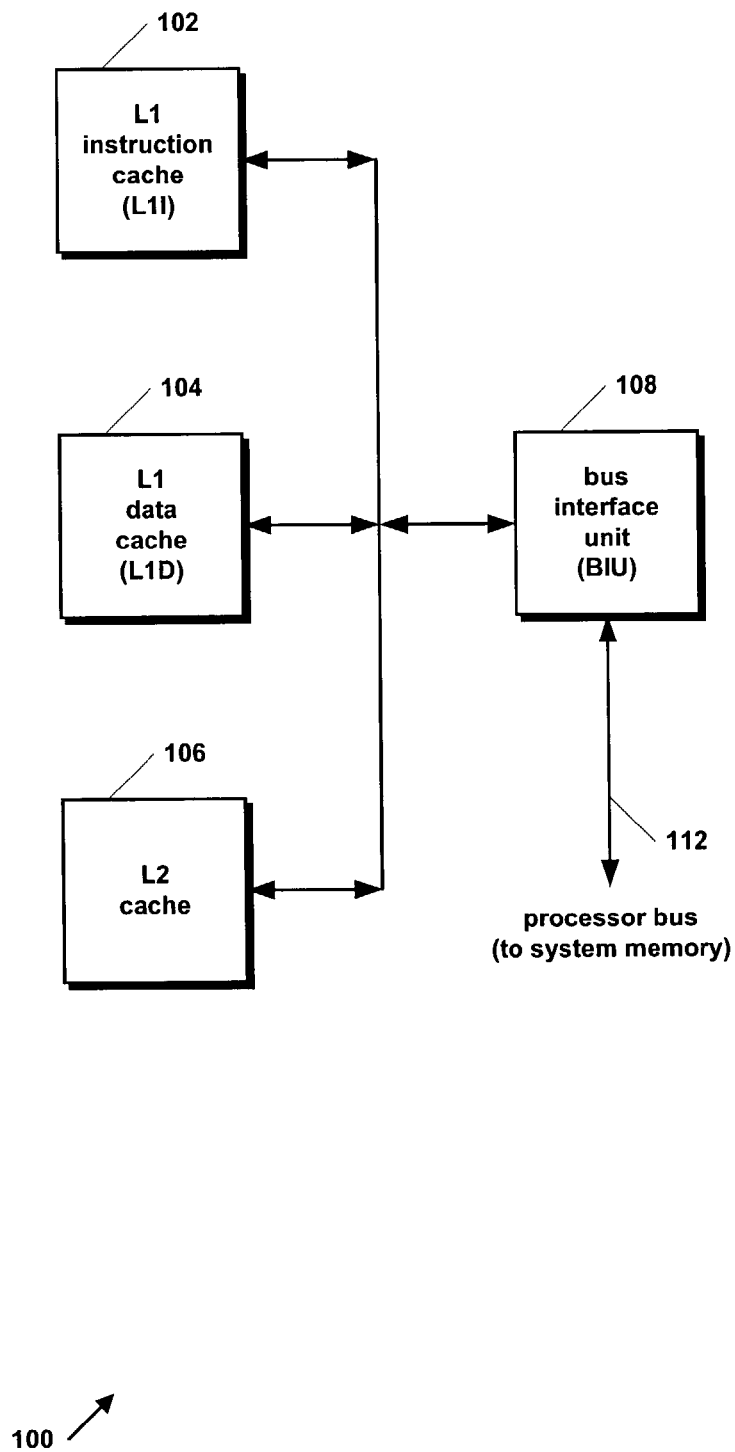
FIG. 1 is a block diagram illustrating a cache hierarchy in a microprocessor according to the present invention.

Referring now to FIG. 1, a block diagram illustrating a cache hierarchy in a microprocessor 100 according to the present invention is shown.

Microprocessor 100 comprises a cache hierarchy that includes a level-one instruction (L1I) cache 102, a level-one data (L1D) cache 104, and a level-two (L2) cache 106. The L1I 102 and L1D 104 cache instructions and data, respectively, and L2 cache 106 caches both instructions and data, in order to reduce the time required for microprocessor 100 to fetch instructions and data. L2 cache 106 is between the system memory and the L1I 102 and L1D 104 in the memory hierarchy of the system. The L1I 102, L1D 104, and L2 cache 106 are coupled together. The L1I 102 and L2 cache 106 transfer cache lines between one another, and the L1D 104 and L2 cache 106 transfer cache lines between one another. For example, the L1I 102 and L1D 104 may castout cache lines to or load cache lines from L2 cache 106.

Microprocessor 100 also includes a bus interface unit 108 coupled to the L1I 102, L1D 104, and L2 cache 106. Bus interface unit 108 couples caches 102–106 and other functional blocks in the microprocessor 100 to a processor bus 112. Processor bus 112 couples microprocessor 100 to other system components, such as other microprocessors, I/O devices, and memory devices, such as system memory. Microprocessor 100 and the other devices perform bus transactions on processor bus 112 in order to perform data transfers and to accomplish cache coherence.

Bus interface unit 108 generates transactions on processor bus 112 in response to requests from functional blocks within the microprocessor 100, such as the caches 102–106. For example, if L2 cache 106 receives a read request from another block in microprocessor 100 that misses in L2 cache 106, then L2 cache 106 requests bus interface unit 108 to initiate a transaction on processor bus 112 to read the implicated missing cache line from processor bus 112. Similarly, if L2 cache 106 needs to write a line to system memory, L2 cache 106 will request bus interface unit 108 to generate a transaction on processor bus 112 to write the line to processor bus 112.

In addition, bus interface unit 108 monitors the transactions on processor bus 112 and reflects the transactions to caches 102–106. In particular, if bus interface unit 108 sees an invalidating transaction or transactions that read or write memory on the processor bus 112, the interface unit 108 reflects the transaction in the form of a snoop operation request to caches 102–106.

The cache hierarchy of the microprocessor 100 of FIG. 1 is representative of a microprocessor employing the present invention; however, the present invention is not limited to the embodiment of FIG. 1. Rather, the present invention may be employed in any cache hierarchy configuration in which two caches transfer data between one another, and in which the caches may receive an address colliding snoop operation while the transfer is in progress, i.e., while the transfer is in-flight. Advantageously, L2 cache 106 of the present invention internally handles the effects of a snoop operation generated by a transaction on processor bus 112 whose address collides with an in-flight transfer, rather than canceling the in-flight operation as in the conventional approach.

Figure 2:
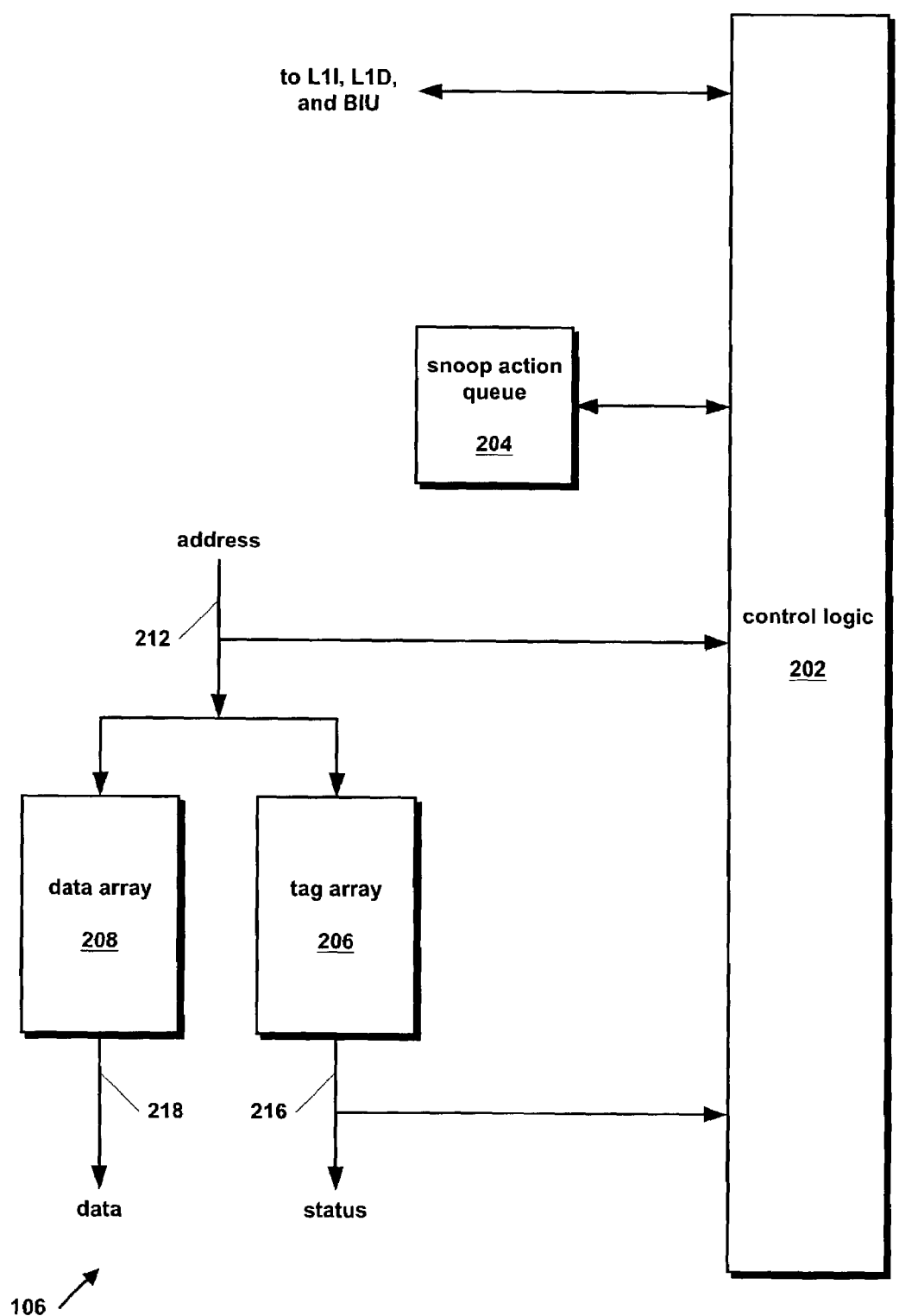
FIG. 2 is a block diagram of the L2 cache of FIG. 1 according to the present invention.

Referring now to FIG. 2, a block diagram of L2 cache 106 of FIG. 1 according to the present invention is shown.

L2 cache 106 includes a data array 208. Data array 208 comprises an array of storage elements for storing cache lines. Data array 208 receives a memory address 212 that indexes into data array 208 to select one of the storage elements in the array. Data array 208 outputs the cache line selected by address 212 on data output 218. In particular, data array 208 stores cache lines transferred between L2 cache 106 and L1 caches 102–104.

L2 cache 106 also includes a tag array 206. Tag array 206 comprises an array of storage elements for storing state information regarding the cache lines stored in data array 208. The state information includes cache coherency status information. In one embodiment, the cache coherency information comprises MESI state information, or status. Tag array 206 also receives address 212 that indexes into tag array 206 to select one of the storage elements in the array. Tag array 206 outputs the status selected by address 212 on status output 216.

L2 cache 106 also includes control logic 202 coupled to data array 208 and tag array 206. Control logic 202 is also coupled to L1I 102, L1D 104, and bus interface unit 108 and receives operation requests from them and generates responses to them. Control logic 202 controls the operation of L2 cache 106, as will be described in more detail with respect to the remaining figures.

L2 cache 106 is a multi-pass cache. That is, most operations require two or more passes through L2 cache 106 in order to complete. The first pass through L2 cache 106 reads tag status 216 from tag array 206, and may also read data 218 from data array 208 if the operation is a read type operation. The first pass of an operation is also referred to as a query pass because the cache line status 216 is queried from tag array 206. The second and any needed subsequent passes through L2 cache 106 are finish passes, also referred to as action passes or update passes, because they update cache line status in tag array 206, and may also write data to data array 208 if the operation is a write type operation. Finish passes of snoop operations are referred to as snoop actions.

L2 cache 106 also includes a snoop action queue 204 coupled to control logic 202. Snoop action queue 204 stores snoop actions to be performed by L2 cache 106. Snoop actions are generated by control logic 202. Operation of snoop action queue 204 will be described in more detail with respect to the remaining figures.

Figure 3:
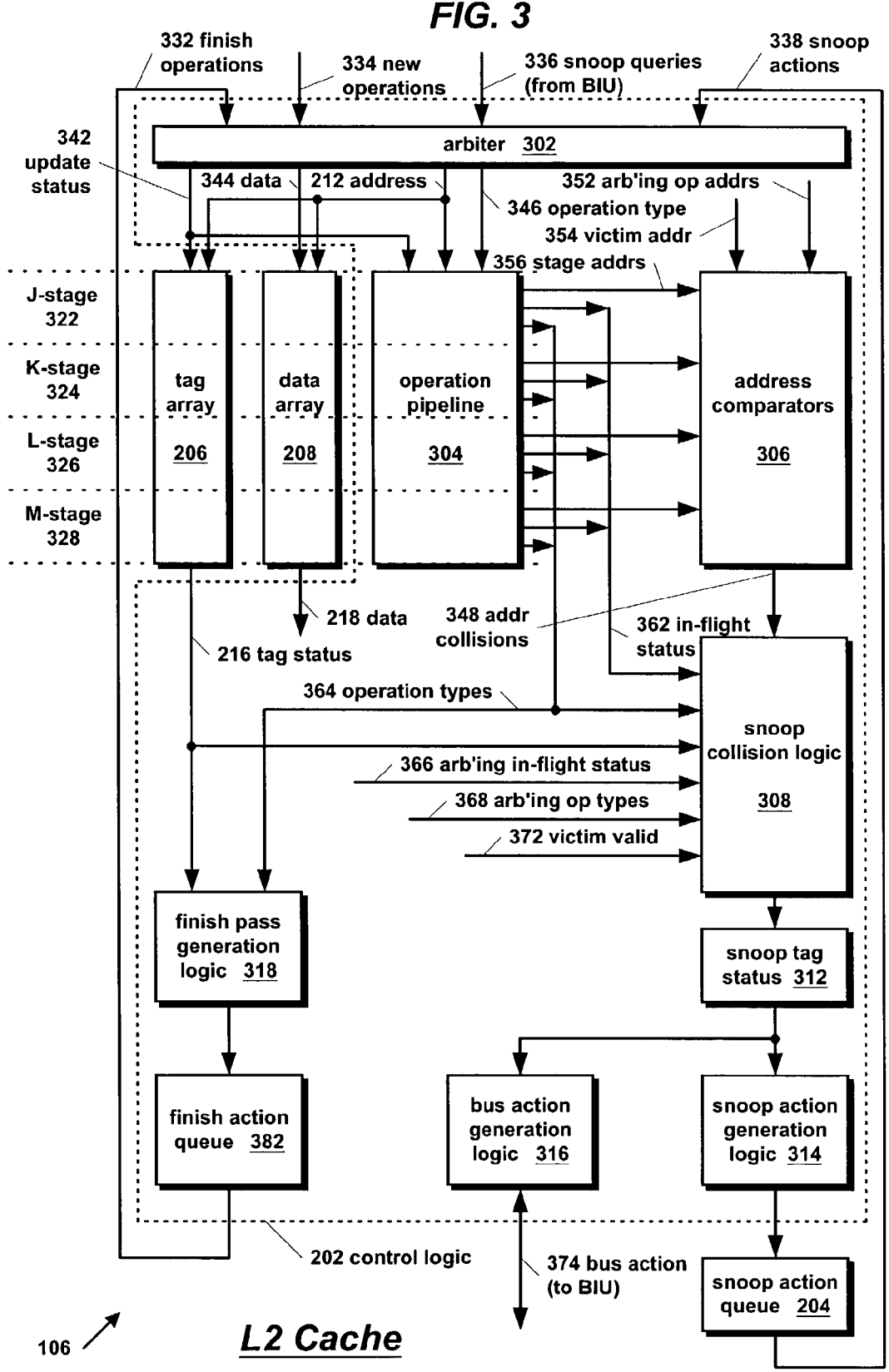
FIG. 3 is a block diagram of the L2 cache of FIG. 1 describing the control logic of FIG. 2 according to the present invention in more detail.

Referring now to FIG. 3, a block diagram of L2 cache 106 of FIG. 1 describing control logic 202 of FIG. 2 according to the present invention in more detail is shown. L2 cache 106 of FIG. 3 comprises control logic 202, snoop action queue 204, tag array 206, and data array 208 of FIG. 2. In one embodiment, L2 cache 106 is a pipelined cache. In the embodiment of FIG. 3, the L2 cache 106 pipeline comprises four stages, denoted J-stage 322, K-stage 324, L-stage 326, and M-stage 328. Tag array 206 and data array 208 each include the four stages J through M 322–328.

Control logic 202 comprises an arbiter 302. Arbiter 302 receives a plurality of requester inputs requesting access to L2 cache 106. One requester is a snoop query 336. Bus interface unit 108 of FIG. 1 generates snoop query 336 requests in response to snooped transactions on external processor bus 112 of FIG. 1.

Another set of requesters includes new operations 334. New operation 334 requests comprise the query pass of L2 cache 106 operations other than snoop queries 336 of snoop operations. In one embodiment, new operations comprise a load operation from L1D 104, a load operation from L1I 102, a castout operation from L1D 104, a castout operation from L1I 102, and a store operation from L1D 104. An L1D load operation comprises a transfer of data from L2 cache 106 to L1D 104. An L1I load operation comprises a transfer of data from L2 cache 106 to L1I 102. An L1D castout operation comprises a transfer of a cache line from L1D 104 to L2 cache 106. An L1I castout operation comprises a transfer of a cache line from L1I 102 to L2 cache 106. An L1D store operation comprises a transfer of data from L1D 104 to L2 cache 106.

Another requester is a snoop action 338. Snoop actions 338 are generated by snoop action generation logic 314 described below in response to a snoop query pass reaching the bottom of the L2 cache 106 pipeline.

Another set of requesters includes finish operations 332. Finish operations 332 comprise the finish pass of L2 cache 106 operations other than snoop actions 338 of snoop operations. In one embodiment, finish operations 332 comprise an L1 load finish, an L1 castout finish, an L1 store finish, and an L2 castout. An L1 load finish comprises a finish pass of an L1D or L1I load operation. An L1 castout finish comprises a finish pass of an L1D or L1I castout operation. An L1 store finish comprises a finish pass of an L1D store operation. An L2 castout comprises L2 cache 106 casting out to system memory a victim cache line allocated by L2 cache 106 for replacement in response to a write type operation to L2 cache 106.

An operation is in-flight if a snoop query with a colliding address enters the L2 cache 106 pipeline after the operation's query pass but before the operation's last finish pass. A snoop operation may also be an in-flight operation if a second snoop query with a colliding address enters the L2 cache 106 pipeline after the first snoop query but before the first snoop action.

Arbiter 302 selects one of requesters 332–338 to have access to tag array 206 and data array 208 based on a priority scheme. That is, arbiter 302 selects one of requesters 332–338 to provide its memory address 212 to tag array 206 and data array 208. Additionally, if the requester 332–338 winning arbitration is a finish pass, it provides its update status 342, or in-flight status 342, to tag array 206. The update status 342 specifies the status to which an in-flight operation will subsequently update the cache coherence status in the tag array 206 for the cache line specified by address 212. The in-flight status, or update status, is included in each finish operation 332 and snoop action 338. Finally, if the requester 332–338 winning arbitration is a write type operation, it provides its data on data signals 344 to data array 208. The operation type of the operating winning arbitration is specified on operation type signal 346. The operation type 346 specifies one of the eleven operations listed in Table 1 below. In one embodiment, the priority scheme of operation types used by arbiter 302 is predetermined as shown in Table 1 below.

TABLE 1

| | |
|---|---|
| 1. Snoop query | |
| 2. L1 Load finish | |
| 3. L2 castout | |
| 4. L1 castout finish | finish pass of in-flight operations |
| 5. L1 store finish | |
| 6. Snoop action | |
| 7. L1D Load | |
| 8. L1I Load | |
| 9. L1D castout | new operations |
| 10. L1I castout | |
| 11. L1D store | |

As shown, snoop actions 338 are the lowest priority requester of the finish passes, i.e., snoop actions 338 are lower priority than finish operations 332. Finish operations 332 and snoop actions 338 are higher priority than any new operation 334 other than a snoop query 336.

Control logic 202 also includes an operation pipeline 304 coupled to arbiter 302. Operation pipeline 304 comprises four stages of storage elements for storing operations selected by arbiter 302 as they proceed through corresponding stages of the tag array 206 and data array 208 of the L2 cache 106 pipeline. Each stage of the operation pipeline 304 stores a memory address 356, an operation type 364, and an in-flight status 362, or update status 362. The memory addresses 356 are piped down from memory address 212. The operation types 364 are piped down from operation type 346. The in-flight statuses 362 are piped down from update status 342.

Control logic 202 also includes a plurality of address comparators 306 coupled to operation pipeline 304. Address comparators 306 receive the memory addresses 356 from each of the operation pipeline 304 stages. In addition, address comparators 306 receive the memory addresses 352 of operations that are currently arbitrating via arbiter 302 for access to L2 cache 106. Finally, address comparators 306 also receive a victim address 354. Victim address 354 is the memory address of a cache line associated with an L1 castout operation, i.e., an operation allocating a new cache line. Address comparators 306 compare the various addresses received to determine whether any address collisions have occurred between a snoop query 336 address and any of the other addresses received by address comparators 306, as described in more detail with respect to Table 2 below. Address comparators 306 indicate the presence of an address collision via address collision signals 348. In one embodiment, an address collision is a match between the most significant bits of the snoop address and the in-flight operation address required to specify a cache line.

Control logic 202 also includes snoop collision logic 308 coupled to address comparators 306. Snoop collision logic 308 receives address collision signals 348. Additionally, snoop collision logic 308 receives tag status 216 from tag array 206, in-flight status values 362 from each of the operation pipeline 304 stages, and in-flight status 366 from operations arbitrating for L2 cache 106 via arbiter 302. Furthermore, snoop collision logic 308 receives operation types 364 from each of the operation pipeline 304 stages, as well as operation types 368 from operations arbitrating for L2 cache 106 via arbiter 302. Finally, snoop collision logic 308 receives a victim valid signal 372, which indicates whether or not victim memory address 354 is valid, i.e., whether the victim of an allocation is valid.

Control logic 202 also includes a snoop tag status 312 coupled to snoop collision logic 308. Snoop collision logic 308 generates snoop tag status 312 in response to the various inputs received. Snoop tag status 312 is used to generate snoop actions and bus actions, as described below. The equation of Table 2 below describes how snoop collision logic 308 generates snoop tag status 312, denoted EsnpTagStatus_M[1:0].

TABLE 2

```
ESnpTagStatus_M[1:0]    =
    ESnp_M & L1LdFin_L          & L2MEqL_P           ? 2'b00 :
    ESnp_M & L1LdFin_K          & L2MEqK_P           ? 2'b00 :
    ESnp_M & L1LdFinReq_P       & L1LdFinEqM         ? 2'b00 :
    ESnp_M & L1StFin_L          & L2MEqL_P           ? L1StFinWrStatus_L[1:0]:
    ESnp_M & L1StFin_K          & L2MEqK_P           ? L1StFinWrStatus_K[1:0]:
    ESnp_M & L1StFinReq_P       & L1StFinEqM_P       ? L1StFinWrStatus_P[1:0]:
    ESnp_M & L1COFinLast_L      & L2MEqL_P           ? L1COFinWrStatus_L[1:0]:
    ESnp_M & L1COFinLast_K      & L2MEqK_P           ? L1COFinWrStatus_K[1:0]:
    ESnp_M & L1COFinReq_P       & L1COFinEqM_P       ? L1COFinWrStatus_P[1:0]:
    ESnpVicCollEarly_M                               ? 2'b00 :
    ESnp_M & L1COFinReq_P       & L1COFinVicVld_P
                                & L2COEqM_P          ? 2'b00 :
    ESnp_M & ESnpFin_L          & L2MEqL_P           ? 2'b00 :
    ESnp_M & ESnpFin_K          & L2MEqK_P           ? 2'b00 :
    ESnp_M & ESnpFinReq_P       & ESnpFinEqM_P       ? 2'b00 :
    HitStatus_M[1:0];
```

In general, signals with a _J, _K, _L, or _M suffix correspond to the J-stage 322, K-stage 324, L-stage 326, or M-stage 328 of the L2 cache 106 pipeline, respectively. Signals with the _P suffix are non-stage-specific. The status values in Table 2 correspond to the MESI state values as follows: 2'b11=Modified; 2'b10=Exclusive; 2'b01=Shared; 2'b00=Invalid. The signals in the equation of Table 2 are defined as follows.

ESnp_M is one of operation type signals 364 and, if true, indicates that an external snoop query type operation is in M-stage 328.

L2MEqL_P is one of address collision signals 348 and, if true, indicates that the memory address 356 of the operation or action in M-stage 328 equals the memory address 356 of the operation in L-stage 326. L2MEqK_P is one of address collision signals 348 and, if true, indicates that the memory address 356 of the operation or action in M-stage 328 equals the memory address 356 of the operation in K-stage 324. L1LdFin_L is one of operation type signals 364 and, if true, indicates that an L1 load finish type operation is in L-stage 326. L1LdFin_K is one of operation type signals 364 and, if true, indicates that an L1 load finish type operation is in K-stage 324. L1LdFinReq_P is one of arbitrating operation type signals 368 and, if true, indicates that an L1 load finish type operation is arbitrating via arbiter 302 for access to L2 cache 106. L1LdFinEqM_P is one of address collision signals 348 and, if true, indicates that the memory address 352 of an arbitrating L1 load finish operation equals the memory address 356 of the operation in M-stage 328. L1StFin_L is one of operation type signals 364 and, if true, indicates that an L1 store finish type operation is in L-stage 326. L1StFin_K is one of operation type signals 364 and, if true, indicates that an L1 store finish type operation is in K-stage 324. L1StFinReq_P is one of arbitrating operation type signals 368 and, if true, indicates that an L1 store finish type operation is arbitrating via arbiter 302 for access to L2 cache 106. L1StFinEqM_P is one of address collision signals 348 and, if true, indicates that the memory address 352 of an arbitrating L1 store finish operation equals the memory address 356 of the operation in M-stage 328. L1StFinWrStatus_L[1:0] is one of in-flight status signals 362 and indicates the cache coherence status value to which an L1 store finish operation in L-stage 326 will be updating tag array 206. L1StFinWrStatus_K[1:0] is one of in-flight status signals 362 and indicates the cache coherence status value to which an L1 store finish operation in K-stage 324 will be updating tag array 206. L1StFinWrStatus_P[1:0] is one of arbitrating in-flight status signals 366 and indicates the cache coherence status value to which an L1 store finish operation arbitrating via arbiter 302 will be updating tag array 206. L1COFinLast_L is one of operation type signals 364 and, if true, indicates that the last pass of an L1 castout finish type operation is in L-stage 326. L1COFinLast_K is one of operation type signals 364 and, if true, indicates that the last pass of an L1 castout finish type operation is in K-stage 324. L1COFinReq_P is one of arbitrating operation type signals 368 and, if true, indicates that an L1 castout finish type operation is arbitrating via arbiter 302. L1COFinEqM_P is one of address collision signals 348 and, if true, indicates that the memory address 352 of an arbitrating L1 castout finish operation equals the memory address 356 of the operation in M-stage 328. L1COFinVicVld_P is victim valid signal 372. L1COFinWrStatus_L[1:0] is one of in-flight status signals 362 and indicates the cache coherence status value to which an L1 castout finish operation in L-stage 326 will be updating tag array 206. L1COFinWrStatus_K[1:0] is one of in-flight status signals 362 and indicates the cache coherence status value to which an L1 castout finish operation in K-stage 324 will be updating tag array 206. L1COFinWrStatus_P[1:0] is one of arbitrating in-flight status signals 366 and indicates the cache coherence status value to which an L1 castout finish operation arbitrating via arbiter 302 will be updating tag array 206. L2COEqM_P is one of address collision signals 348 and, if true, indicates that L1 castout allocation victim memory address 354 equals the memory address 356 of the operation in M-stage 328. ESnpFin_L is one of operation type signals 364 and, if true, indicates that a snoop finish, or snoop action, type operation is in L-stage 326. ESnpFin_K is one of operation type signals 364 and, if true, indicates that a snoop finish, or snoop action, type operation is in K-stage 324. ESnpFinReq_P is one of arbitrating operation type signals 368 and, if true, indicates that a snoop action type operation is arbitrating via arbiter 302 for access to L2 cache 106. ESnpFinEqM_P is one of address collision signals 348 and, if true, indicates that the memory address 352 of an arbitrating snoop finish operation equals the memory address 356 of the operation in M-stage 328.

HitStatus_M[1:0] is tag status 216 output of tag array 206. As may be seen from the equation of Table 2, if no address collisions between a snoop query and an in-flight operation are present, then the default value of snoop tag status 312, denoted EsnpTagStatus_M[1:0] in Table 2, is tag status 216, denoted HitStatus_M[1:0].

ESnpVicCollEarly_M is a signal generated internal to snoop collision logic 308 for use in generating EsnpTagStatus_M[1:0]. ESnpVicCollEarly_M, if true, indicates that a snoop query is in M-stage 328 that, when it was previously in K-stage 324 or L-stage 326, collided with a valid victim address 354 of an L1 castout victim that will be overwritten by an L1 castout operation whose finish pass is arbitrating via arbiter 302. Snoop collision logic 308 generates ESnpVicCollEarly_M by storing in a register the term (ESnp_K & L1COFinReq_P & L1COFinVicVld_P & L2COEqK_P) while the snoop query is in K-stage 324, then logically OR'ing the registered value with the term (ESnp_L & L1COFinReq_P & L1COFinVicVld_P & L2COEqL_P) while the snoop query is in L-stage 326, then storing the result in a register, then outputting the second registered value when the snoop query reaches M-stage 328. ESnp_K is one of operation type signals 364 and, if true, indicates that an external snoop query type operation is in K-stage 324. ESnp_L is one of operation type signals 364 and, if true, indicates that an external snoop query type operation is in L-stage 326. L2COEqK_P is one of address collision signals 348 and, if true, indicates that L2 castout allocation victim memory address 354 equals the memory address 356 of the operation in K-stage 324. L2COEqL_P is one of address,collision signals 348 and, if true, indicates that L2 castout allocation victim memory address 354 equals the memory address 356 of the operation in L-stage 326.

As may be observed from Table 2, both the tag status 216 of a snoop query reaching the bottom of L2 cache 106 pipeline and the in-flight status 362 and 366 of finish passes of operations in the pipeline or arbitrating for the pipeline, respectively, are factored into the generation of snoop tag status 312. Advantageously, the present invention uses the intermediate snoop tag status 312 to generate a snoop action for updating the cache coherency status of the cache line implicated by the colliding address and for generating a bus action for responding to the external snoop transaction on processor bus 112 of FIG. 1, as described below, thereby avoiding cancellation of the in-flight operation which the conventional method does.

Control logic 202 also includes snoop action generation logic 314 coupled to snoop tag status 312. Snoop action generation logic 314 generates snoop actions based on snoop tag status 312. Snoop actions generated by snoop action generation logic 314 are stored in snoop action queue 204 of FIG. 2 for provision to arbiter 302 via snoop action signal 338. A snoop action comprises three components, as illustrated by FIG. 4.

Referring now to FIG. 4, a block diagram illustrating snoop action queue 204 of FIG. 2 according to the present invention is shown. The snoop action queue 204 of FIG. 4 is populated with exemplary values for illustrative purposes. Snoop action queue 204 comprises a queue of storage elements. Each storage element contains a valid bit 402, a memory address 404, snoop update status bits 406, and a provide data bit 408.

Valid bit 402 indicates whether the entry in snoop action queue 204 contains a valid snoop action. Once a valid entry in snoop action queue 204 is output and provided to arbiter 302 and wins arbitration, the entry is marked invalid until a new valid snoop action is stored in the entry. Address 404 specifies the memory address of the cache line implicated by the snoop operation. Address 404 is supplied via address 356 of FIG. 3 from M-stage 328. Snoop update status 406 stores the cache coherency status to which the snoop action will update tag array 206 for the cache line specified by address 404. In one embodiment, snoop update status 406 comprises one of the four MESI state values. Provide data bit 408 specifies whether or not the snoop action in the entry will provide data from data array 208, such as a modified cache line requested by the external snoop transaction on processor bus 112. Snoop update status 406 and provide data bit 408 are generated according the description of Table 3 below.

Referring again to FIG. 3, the equation of Table 3 below describes how snoop action generation logic 314 generates snoop actions stored in snoop action queue 204.

TABLE 3

ESnpFinLd =
(ESnp_M & ESnpTagStatus[1]) | (Esnp_M & ESnpTagStatus[0]);
ESnpProvideData = ESnp_M & ESnpTagStatus[1]& ESnpTagStatus[0];
EsnpUpdateStatus[1]= 1'b0; // update to either Shared or Invalid
EsnpUpdateStatus[0]= ESnp_M & ShOK &
   (( ESnpTagStatus[1] & ~ESnpTagStatus[0]) |    // E status
   (~ESnpTagStatus[1] &  ESnpTagStatus[0]));    // S status ESnpFinLd, if true, instructs snoop action queue 204 to load the snoop finish pass, or snoop action, generated by snoop action generation logic 314. As may be seen, snoop action queue 204 loads a snoop action if snoop tag status 312 is Modified, Exclusive, or Shared, but not if snoop tag status 312 is Invalid.

As may be seen from Table 3, a snoop action provides data only if the implicated cache line had a Modified status.

As may be seen from Table 3, L2 cache 106 allows cache lines to be shared if the implicated cache line was in the Exclusive or Shared state already. In another embodiment, the equation for the snoop update status 406 of FIG. 4 is: ESnpUpdateStatus=2'b00. That is, L2 cache 106 invalidates a cache line implicated by a snoop collision and does not enable sharing of the cache line.

ShOK is a signal from processor bus 112 of FIG. 1 indicating the external snoop transaction allows microprocessor 100 to retain the implicated cache line in the Shared state, such as for an instruction read rather than an invalidating snoop transaction.

Control logic 202 also includes bus action generation logic 316 coupled to snoop tag status 312 and to bus interface unit 108 of FIG. 1. Bus action generation logic 316 generates a bus action 374 for provision to bus interface unit 108 based on snoop tag status 312. The bus action 374 instructs bus interface unit 108 how to respond on processor bus 112 to the external snoop transaction that caused bus interface unit 108 to generate the snoop operation for which the snoop tag status 312 was generated.

Control logic 202 also includes finish pass generation logic 318 coupled to tag array 206 and operation pipeline 304. Finish pass generation logic 318 generates finish passes, or finish actions, for new operations 334, i.e., for non-snoop operations. In one embodiment, finish pass generation logic 318 generates L1 load finish, L1 castout finish, L1 store finish, and L2 castout passes, or operations. The finish operations 332 include update status for updating tag array 206, a memory address for indexing tag array 206 and data array 208, an operation type, and data if the finish operation is a write, all of which are provided on signals 342, 212, 346, and 344, respectively, when the finish operation is selected by arbiter 302.

Control logic 202 also includes a finish action queue 382 coupled to finish pass generation logic 318. Finish action queue 382 receives finish actions from finish pass generation logic 318 and stores the finish actions for provision to arbiter 302 on finish pass signal 332.

Figure 5:
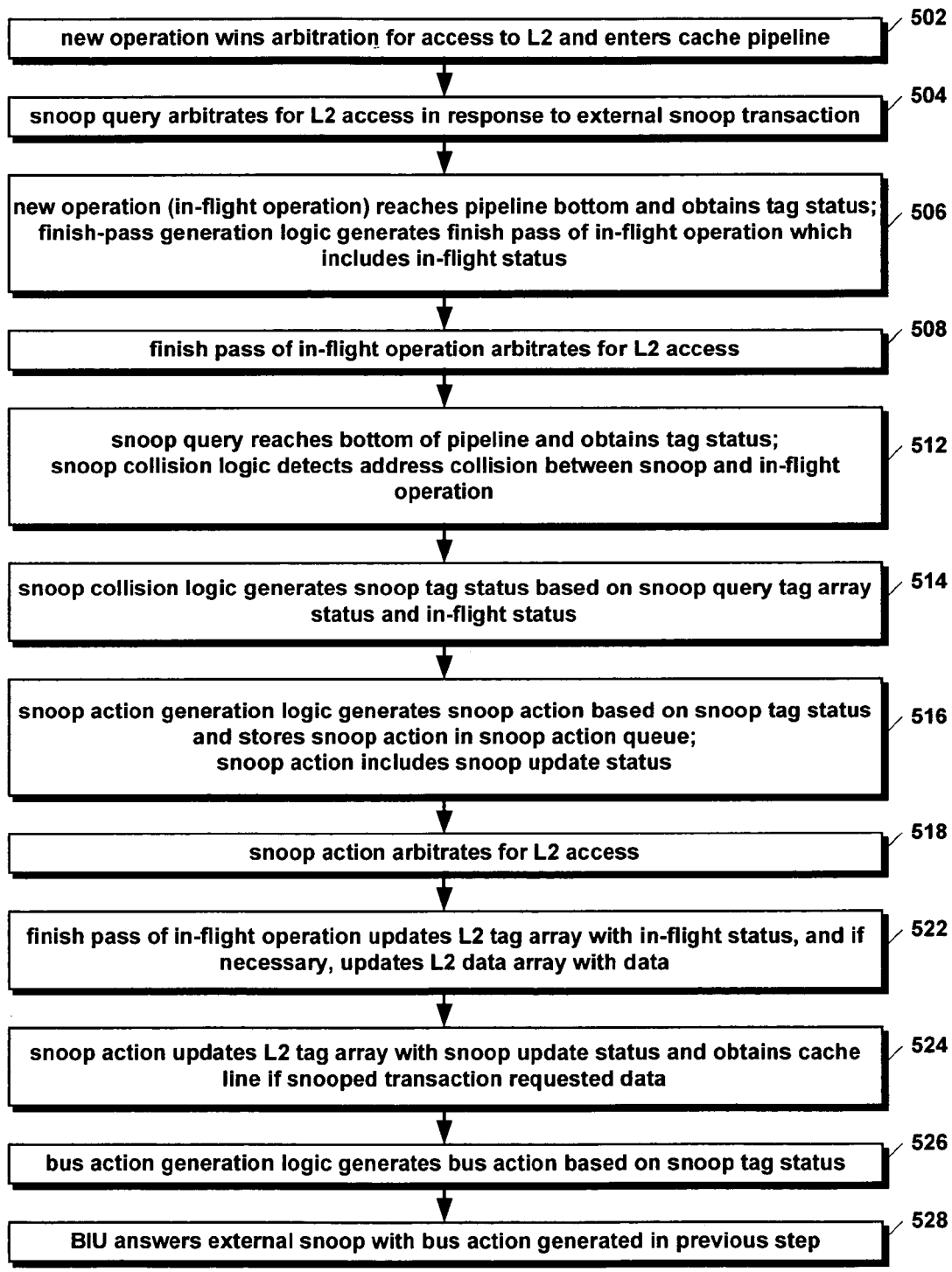
FIG. 5 is a flowchart illustrating operation of the L2 cache of FIG. 1 to internally handle a collision between a snoop operation generated by an externally snooped transaction and an in-flight operation according to the present invention.

Referring now to FIG. 5, a flowchart illustrating operation of the L2 cache 106 of FIG. 1 to internally handle a collision between a snoop operation generated by an externally snooped transaction and an in-flight operation according to the present invention is shown. Flow begins at block 502.

At block 502, arbiter 302 of FIG. 3 selects a new operation 334 of FIG. 3 to award access to the L2 cache 106 and enters the J-stage 322 of the pipeline of FIG. 3. That is, the new operation 334 memory address 212 is presented to tag array 206, data array 208, and operation pipeline 304 of FIG. 3, and the new operation 334 operation type 346 is provided to operation pipeline 304. Flow proceeds to block 504.

At block 504, arbiter 302 receives a snoop query operation 336 of FIG. 3 from bus interface unit 108 of FIG. 1, and the snoop query operation 336 arbitrates for access to L2 cache 106. The bus interface unit 108 generates the snoop query 336 in response to an external transaction snooped on processor bus 112 of FIG. 1. Flow proceeds to block 506.

At block 506, the new operation 334 reaches the bottom of the pipeline, i.e., reaches M-stage 328 and obtains tag status 216 from tag array 206. The new operation 334 is now an in-flight operation since a colliding snoop query has entered the L2 cache 106 pipeline before the last finish pass of the new operation 334. Finish pass generation logic 318 generates a finish pass of the in-flight operation, which includes in-flight status for updating tag array 206, based on obtained tag status 216 and operation type 364. Flow proceeds to block 508.

At block 508, finish action queue 382 provides the finish pass 332 of the in-flight operation generated during block 506 to arbiter 302 and the in-flight operation arbitrates via arbiter 302. Flow proceeds to block 512.

At block 512, the snoop query reaches M-stage 328. Snoop collision logic 308 detects an address collision between the snoop operation and the in-flight operation. Flow proceeds to block 514.

At block 514, snoop collision logic 308 generates snoop tag status 312 based on tag status 216 received from tag array 206 by the snoop query and based on the relevant in-flight status 362 of the in-flight operation as described above with respect to Table 2. Flow proceeds to block 516.

At block 516, snoop collision logic 308 generates a snoop action 338 for storage in snoop action queue 204 based on snoop tag status 312 according to Table 3 as described above. The snoop action 338 includes a snoop update status for updating tag array 206. Flow proceeds to block 518.

At block 518, the snoop action 338 generated during block 516 arbitrates for access to L2 cache 106 via arbiter 302. Flow proceeds to block 522.

At block 522, the finish pass of the in-flight operation updates tag array 206 with its in-flight status on update status signal 342. Additionally, if the in-flight operation is a write type operation, it writes the data to data array 208 on data signal 344. Flow proceeds to block 524.

At block 524, the snoop action 338 updates tag array 206 with the snoop update status generated during block 516. Additionally, if the provide data field 408 of the snoop action 338 indicates that the snoop operation is to provide data to the external snoop transaction on processor bus 112, then the snoop action 338 obtains the data from data array 208 on data signals 218 for provision to bus interface unit 108. Flow proceeds to block 526.

At block 526, bus action generation logic 316 generates a bus action 374 based on snoop tag status 312. In one embodiment, block 526 occurs substantially concurrently with block 516. Flow proceeds to block 528.

At block 528, bus interface unit 108 answers the external snoop transaction on processor bus 112 with the bus action 374 generated during block 526, which may include providing data obtained during block 524. Flow ends at block 528.

Various timing diagrams will now be described for illustrating the present invention. In order to more fully appreciate the present invention, a timing diagram illustrating operation of a conventional L2 cache will first be discussed.

Referring now to FIG. 6, a related art timing diagram illustrating an example of operation of a conventional L2 cache canceling an in-flight operation with which a snoop collides is shown. The example assumes a four-stage pipeline in the conventional L2 cache similar to the stages of L2 cache 106 of FIG. 3. The example also assumes the conventional L2 cache is a multi-pass cache. The timing diagram comprises nine columns corresponding to nine successive clock cycles and four rows corresponding to the four pipeline stages of the conventional L2 cache denoted J, K, L, and M. Each entry in the diagram shows the contents of the specified pipeline stage during the specified clock cycle.

In the example of FIG. 6, a conventional L2 cache receives a store operation having a memory address A initiated by another cache in a conventional microprocessor, such as an L1 cache. The store operation to address A is followed by a snoop operation having the same memory address A while the store operation is still in progress, thus generating a collision between the store operation and the snoop operation. In the example, the snoop operation is an invalidating snoop operation, i.e., the external snoop transaction on the processor bus was an invalidating transaction, such as a write invalidate or read invalidate transaction.

During clock cycle 1, a query pass of the store operation, denoted StQ A, proceeds into pipeline stage J. During clock cycle 2, a query pass of the snoop operation, denoted SnpQ A, proceeds into the pipeline after the store query. During clock cycle 3, both operations proceed down the pipeline to the next stage.

During clock cycle 4, the store query reaches the bottom of the pipeline and the cache provides a tag status of Exclusive for the cache line specified by address A. If no collision were present with the snoop query, then a finish pass for the store operation would proceed to update the cache line at address A to a status of Modified and write the data into the cache. However, because the cache detects the collision between the store query and the snoop query, the conventional cache cancels the store operation.

During clock cycle 5, the snoop query reaches the bottom of the pipeline and the cache provides a tag status of Exclusive for the cache line specified by address A. Because the store operation has been cancelled, Exclusive is the correct status of the cache line. That is, the status of the line is whatever it would have been if the store operation had never been initiated. During clock cycle 6, a snoop action pass for the snoop operation, denoted SnpA A, enters into the J stage of the pipeline. During clock cycles 7 through 9, the snoop action proceeds through the remaining stages of the pipeline in order to update the cache line status to Invalid, as specified by the external transaction snooped by the cache.

The conventional L2 cache must cancel the store operation as described above. Otherwise a finish pass of the store operation would write valid data into the cache and update the status to Modified, and then the snoop action would invalidate the line since it received a status of Exclusive (having obtained the status before the store finish pass updated the status to Modified) indicating that the line was not modified. The result would be that the valid store data would be lost. Therefore, the conventional L2 cache must cancel the store operation so that the snoop query receives the correct status. Canceling the store operation, i.e., the in-flight operation, has negative effects as described herein.

Referring now to FIG. 7, a timing diagram illustrating operation of L2 cache 106 of FIG. 1 according to the flowchart of FIG. 5 according to the present invention is shown. As will be seen from FIG. 7, L2 cache 106 of the present invention advantageously handles the effects of colliding snoop operations internal to itself, rather than canceling the in-flight operation, thereby alleviating the negative ramifications of in-flight operation cancellation.

In the timing diagram of FIG. 7, L2 cache 106 of FIG. 3 receives an L1D store operation, i.e., a store operation query having a memory address A on new operation signal 334 initiated by L1D 104 of FIG. 1. The store operation to address A is followed by a snoop operation having the same memory address A on snoop query signal 336 from bus interface unit 108 while the store operation is in-flight. The snoop query generates a collision between the store operation and the snoop operation. In the example, the snoop operation is an invalidating snoop operation, i.e., the external snoop transaction on processor bus 112 was an invalidating transaction, such as a write invalidate or read invalidate transaction. In FIG. 7, the store query pass is denoted StQ A, the snoop query pass is denoted SnpQ A, and the snoop action pass is denoted SnpA A, as in FIG. 6. Additionally, a store action pass, or store finish pass of the store operation to address A is denoted StA A.

During cycle 1, arbiter 302 selects the store query pass and the store query proceeds into J-stage 322 of FIG. 3 according to block 502 of FIG. 5. During clock cycle 2, the store query proceeds to K-stage 324 and the snoop query arbitrates for access to L2 cache 106 according to block 504. During clock 3, the store query and snoop query progress to the L-stage 326 and K-stage 324, respectively.

During clock 4, the store query reaches M-stage 328 and receives from tag array 206 a tag status 216 value of Exclusive. Finish pass generation logic 318 receives the Exclusive tag status 216 and an L1D store operation type 364 value from operation pipeline 304 and generates the store finish pass, including the update status, or in-flight status, based on the obtained tag status 216 and operation type 364 according to block 506. In this case, the in-flight status value generated is Modified.

During clock 5, the store finish arbitrates via arbiter 302 and proceeds into J-stage 322, according to block 508.

Also during clock 5, snoop collision logic 308 detects a collision between the store operation and the snoop operation, according to block 512. Also, the snoop query reaches M-stage 328 and obtains from tag array 206 a tag status 216 value of Exclusive. However, the Exclusive status of the line is incorrect, or will be incorrect once the store action pass updates the status to Modified during clocks 6 through 8 as described below. Consequently, snoop collision logic 308 according to the present invention advantageously generates a snoop tag status 312 that is more up to date than the incorrect Exclusive tag status 216 value received by the snoop query. That is, snoop collision logic 308 generates a snoop tag status 312 based on the obtained snoop query tag status 216 and the store action update status value of Modified, i.e., in-flight status, as described in Table 2 according to block 514. In this case, according to Table 2, snoop collision logic 308 generates a snoop tag status 312 value of Modified because the snoop query is in M-stage 328 as indicated by operation type signals 364; the store finish is in L-stage 326 as indicated by operation type signals 364; the addresses 356 in M-stage 328 and L-stage 326 collide as indicated by address collision signals 348; and the in-flight store finish update status in L-stage 326 is Modified.

In response to the generation of the snoop tag status 312, snoop action generation logic 314 generates the snoop action based on snoop tag status 312 according to Table 3 and stores the snoop action in snoop action queue 204, according to block 516. In the example, according to Table 3, snoop action generation logic 314 generates a true value on the ESnpFinLd signal so that a snoop action will be loaded into snoop action queue 204; generates a true value for the provide data field 408 since the snoop tag status 312 is Modified (2'b11); and generates a snoop update status 406 value of Invalid (2'b00) since in the example the external bus transaction was an invalidating type of transaction, i.e., sharing was not allowed.

During clock 6, the snoop action arbitrates via arbiter 302 and proceeds into J-stage 322, according to block 518. During clocks 6 through 8, the store action proceeds through the K-stage 324, L-stage 326, and M-stage 328 to update tag array 206 with the Modified in-flight status value and to write the store data into data array 208, according to block 522.

During clocks 7 through 9, the snoop action proceeds through the K-stage 324, L-stage 326, and M-stage 328 to update tag array 206 with the Invalid snoop update status value, according to block 524. Additionally, during clock 9 the snoop action obtains cache line data on data signals 218 from data array 208 if the provide data 408 field of the snoop action indicates the transaction snooped on processor bus 112 should be provided data. In one embodiment, one or more subsequent action passes may be generated to obtain the data requested by the transaction snooped on processor bus 112.

During subsequent clock cycles, bus action generation logic 316 generates a bus action based on snoop tag status 312 and provides the bus action to bus interface unit 108, according to block 526, and bus interface unit 108 answers the snooped external transaction with the bus action, according to step 528. Advantageously, the bus action response back to the snooped external transaction on processor bus 112 can be performed in subsequent clock cycles, and is therefore not timing critical like the signals between the L2 cache 106 and the L1 caches 102 and 104. Consequently, the snoop collisions affect only control logic internal to L2 cache 106 or affect non-timing-critical logic, thereby potentially improving the operating frequency of microprocessor 100 and reducing complexity by eliminating the need for communication between the caches 102–106 associated with in-flight operation cancellations.

Although the present invention and its objects, features, and advantages have been described in detail, other embodiments are encompassed by the invention. For example, although the present invention has been described with respect to a write invalidate snooping protocol, the invention is also adaptable to other protocols such as a write update protocol. Additionally, although the present invention has been described with respect to the cache coherence status MESI protocol, the invention is also adaptable to other cache coherence protocols. Finally, although the L2 cache of the present invention has been described in the context of a system wherein the L2 is situated between L1 caches and system memory, the L2 cache may function at any level in the cache hierarchy of a microprocessor in which in-flight operations may collide with snoop operations.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A pipelined multi-pass cache memory in a microprocessor, which internally handles an in-flight transfer of a cache line between itself and a second cache that address-collides with a snoop operation, rather than canceling the in-flight operation, the cache memory comprising:
    a single-ported memory array, for storing cache coherency status for a plurality of cache lines;
    an arbiter, coupled to said single-ported memory array, configured to arbitrate among requests to pass through the cache memory pipeline to access said single-ported memory array to query or update said cache coherency status, and configured to grant access to a snoop query request temporally between granting access to a query request of an operation and granting access to a finish request of said operation, said operation for transferring a cache line between the cache memory and another cache memory in the microprocessor, said query request and said finish request comprising an address of said cache line, said snoop query comprising a snoop address; and
    control logic, coupled to said memory array, configured to generate said finish request in response to said query request of said operation, and configured to detect a collision between said snoop address and said address of said cache line of said finish request, and configured to generate a snoop action request to said arbiter, wherein said finish request comprises an update status for updating said cache coherency status in said single-ported memory array at said address of said cache line;
    wherein said snoop action request comprises a snoop update status generated by said control logic based on said update status of said finish request, based on a type of said finish request, and based on detection of said collision;
    wherein said arbiter is configured to grant access to said snoop action request to update said cache coherency status with said snoop update status, after granting access to said finish request to update said cache coherency status, whereby the cache memory internally handles said collision to eliminate the need to retry said operation for transferring a cache line between the cache memory and said another cache memory of the microprocessor.

2. The cache memory of claim 1, further comprising:
    a data array, coupled to said memory array, for storing a plurality of cache lines, wherein said memory array correspondingly stores said cache coherency status for said plurality of cache lines stored in said data array.

3. The cache memory of claim 2, wherein said control logic allows said finish request to complete by selectively writing said cache line to said data array or reading said cache line from said data array, rather than canceling said finish request, in response to detection of said collision.

4. The cache memory of claim 2, wherein said query request of said operation comprises a first pass of said operation through a pipeline of the cache memory, wherein said query request of said operation obtains first cache coherency status from said memory array in response to providing said cache line address thereto.

5. The cache memory of claim 4, wherein said snoop query request comprises a first pass of a snoop operation through said pipeline, wherein said snoop query request obtains second cache coherency status from said memory array in response to providing said snoop address thereto.

6. The cache memory of claim 5, wherein said snoop query request obtains said second cache coherency status from said memory array subsequent to said query request of said operation obtaining said first cache coherency status from said memory array.

7. The cache memory of claim 6, wherein said finish request comprises a pass of said operation through said pipeline subsequent to said query request of said operation, for selectively reading said cache line from said data array or writing said cache line to said data array based on said type of said finish request.

8. The cache memory of claim 7, wherein said type of said finish request comprises one of a list comprising:
    a) a castout of said cache line from said another cache memory to the cache memory;
    b) a store of one or more bytes of data of said cache line from said another cache memory to the cache memory; and
    c) a load of said cache line from the cache memory to said another cache memory.

9. The cache memory of claim 5, wherein said finish request updates said memory array with said update status of said finish request subsequent to said snoop query request obtaining said second cache coherency status.

10. The cache memory of claim 1, further comprising:
    a snoop action queue, coupled to said control logic, configured to store said snoop action request and a plurality of snoop action requests for requesting access to said single-ported memory array.

11. The cache memory of claim 5, wherein said control logic generates said snoop update status also based on said second cache coherency status obtained by said snoop query request.

12. The cache memory of claim 1, wherein said control logic generates a said snoop update status to a shared cache coherency status if said type of said finish request is a write type, and if said update status of said finish request is an exclusive cache coherency status, and if a snoop transaction on a bus external to the microprocessor associated with said snoop query request allows the microprocessor to retain said cache line in a shared cache coherency status.

13. The cache memory claim 1, wherein said arbiter receives said snoop query request from a bus interface unit coupled to the cache memory.

14. The cache memory of claim 13, wherein said bus interface unit issues said snoop query request to the cache memory in response to snooping a transaction on a bus external to the microprocessor.

15. The cache memory of claim 14, wherein said control logic generates a bus action based on said snoop update status, wherein said control logic provides said bus action to said bus interface unit for response to said external transaction snooped by said bus interface unit.

16. The cache memory of claim 1, wherein said control logic generates said snoop update status further based on whether a snoop transaction on a bus external to the microprocessor associated with said snoop query request allows the microprocessor to retain said cache line in a shared cache coherency status.

17. The cache memory of claim 1, wherein said arbiter selects snoop query requests as highest priority among said requests for access to said single-ported memory array.

18. The cache memory of claim 17, wherein said arbiter selects finish requests of operations for transferring a cache line between the cache memory and said another cache memory as next highest priority after said snoop query requests among said requests for access to said single-ported memory array.

19. The cache memory of claim 18, wherein said arbiter selects snoop action requests as next highest priority after said finish requests among said requests for access to said single-ported memory array.

20. The cache memory of claim 19, wherein said arbiter selects query requests of said operations for transferring a cache line between the cache memory and said another cache memory as next highest priority after said snoop action requests among said requests for access to said single-ported memory array.

21. The cache memory of claim 1, further comprising:
a plurality of address comparators, comprised in said control logic, for detecting said collision between said snoop address and said address of said cache line.

22. The cache memory of claim 21, wherein said collision comprises a match between a plurality of most significant bits of said snoop address and said address of said cache line.

23. A multi-pass pipelined second level (L2) cache memory in a microprocessor for internally handling an in-flight operation transferring a cache line between the L2 cache and another cache in the microprocessor whose address collides with a snoop operation received in response to a transaction snooped on an external bus of the microprocessor, rather than canceling the in-flight operation, the L2 cache comprising:
a single-ported memory array, for storing a plurality of cache coherency statuses of a corresponding plurality of cache lines;
control logic, coupled to said single-ported memory array, configured to generate a snoop action pass of the snoop operation through the L2 cache pipeline, wherein said snoop action pass comprises a snoop update status;
wherein said snoop update status is based on an in-flight update status of a finish pass through the pipeline of the in-flight operation and based on detection of an address collision between a query pass through the pipeline of the snoop operation and said finish pass of the in-flight operation and based on a type of said in-flight operation;
wherein said snoop query pass accesses said single-ported memory array temporally between a query pass through said pipeline of said in-flight operation and said finish pass of said in-flight operation;
wherein said snoop action pass updates said cache coherency status of the cache line within said single-ported memory array to said snoop update status after said finish pass of the in-flight operation updates said cache coherency status to said in-flight update status.

24. The L2 cache of claim 23, wherein said snoop action pass also selectively provides one or more bytes of data of the cache line to the snooped transaction.

25. The L2 cache of claim 23, wherein said single-ported memory array is further configured to store a plurality of address tags of said corresponding plurality of cache lines.

26. The L2 cache of claim 25, wherein said in-flight operation finish pass updates said cache coherency status of the cache line in said memory array to said in-flight update status after the snoop operation query pass queries said memory array for said cache coherency status of the cache line.

27. The L2 cache of claim 26, wherein said control logic generates said snoop update status also based on said cache coherency status of the cache line queried by said snoop operation query pass.

28. The L2 cache of claim 23, wherein said cache coherency status conforms to the MESI cache coherency status protocol.

29. The L2 cache of claim 23, further comprising:
bus action generation logic, coupled to said control logic, for generating a bus action based on said snoop update status.

30. The L2 cache of claim 29, further comprising:
a bus interface unit, coupled to said bus action generation logic, for receiving said bus action and responding on the external bus to the snooped transaction based on said bus action.

31. A method for a first multi-pass pipelined cache to internally handle an in-flight transfer of a cache line between itself and a second cache and which address-collides with a snoop operation, rather than the first cache canceling the in-flight operation, the method comprising:
querying a single-ported memory array of the first cache for a first status of the cache line by the in-flight operation, during a first pass through the pipeline;
querying said single-ported memory array for a second status of the cache line by the snoop operation, during a second pass through the pipeline, wherein the second pass begins subsequent to a beginning of the first pass;
updating said single-ported memory array with a third status for the cache line by the in-flight operation, after said querying for said second status, during a third pass through the pipeline, wherein the third pass begins subsequent to the second pass;
generating a fourth status based on said second and third status and based upon detection of an address collision between the snoop operation and the in-flight operation and based on a type of said in-flight operation; and
updating said single-ported memory array with said fourth status for the cache line by the snoop operation, after said updating with said third status, during a fourth pass through the pipeline, wherein said fourth pass begins subsequent to the third pass, whereby cancellation of the in-flight operation is avoided.

32. The method of claim 31, further comprising:
updating a data array of the first cache with the cache line in parallel with said updating said memory array with said third status.

33. The method of claim 32, further comprising:
providing data from the cache line to the snoop operation after said updating said data array.

34. The method of claim 31, further comprising:
generating a bus action for the snoop operation based on said second and third status and based upon detection of said address collision.

* * * * *